Patented Oct. 31, 1922.

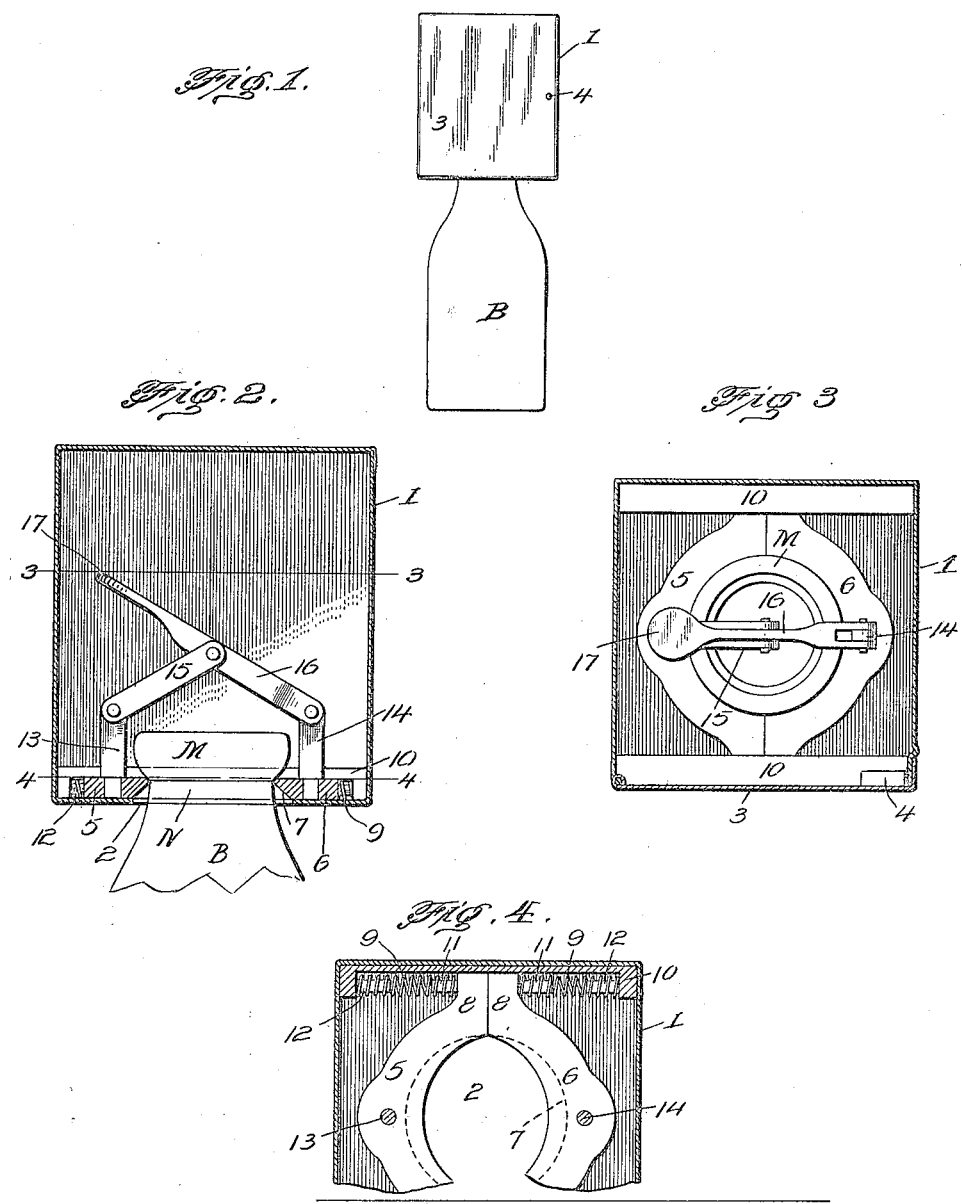

1,434,144

UNITED STATES PATENT OFFICE.

LORENZO THOMAS PERRY AND DAVID H. HALE, OF PITTSBURGH, PENNSYLVANIA.

MILK-BOTTLE HOLDER.

Application filed September 27, 1921. Serial No. 503,497.

*To all whom it may concern:*

Be it known that we, LORENZO THOMAS PERRY and DAVID H. HALE, citizens of the United States, residing at Pittsburgh, in the county of Allegheny and State of Pennsylvania, have invented certain new and useful Improvements in Milk-Bottle Holders, of which the following is a specification.

This invention relates to milk bottle holders.

The object of the invention is to provide a thief proof receptacle for a milk bottle into which the bottle may be quickly and easily inserted by the milkman and held securely against surreptitious removal.

Another object is to provide such a holder with easily operated releasing means accessible to authorized persons only.

With these and other objects in view, the invention consists in certain novel features of construction as hereinafter shown, described and claimed.

In the accompanying drawings:—

Figure 1 represents a front elevation of this improved milk bottle holder with a bottle shown secured therein.

Fig. 2 is an enlarged central vertical section thereof.

Fig. 3 is a horizontal section taken on the line 3—3 of Fig. 2, and

Fig. 4 is a similar view taken on the line 4—4 of Fig. 2.

In the embodiment illustrated, the holder constituting this invention is in the form of a sheet metal receptacle 1 here shown rectangular although obviously it may be of any other desired configuration and provided in the bottom thereof with an opening 2 for the insertion therethrough of the mouth M of a milk bottle B. This casing 1 is equipped with a door 3, preferably at the front thereof which is designed to be secured in closed position by any suitable lock 4, so that when closed no person may obtain access thereto except one having the key to the lock.

Arranged within the container or receptacle 1 on the bottom thereof are two laterally opening bottle gripping jaws 5 and 6, each of which is substantially semi-circular in shape to conform when closed to the neck N of the milk bottle and which are bevelled on their lower faces as shown at 7 to provide gripping edges to engage the neck of the bottle adjacent the mouth thereof which is equipped with the usual bead, as is shown clearly in Fig. 2, these jaws thus operating to securely hold the milk bottle by the mouth when said mouth is inserted therein in a manner presently to be described.

The jaws 5 and 6 are provided each at its opposite ends with radially extending arms 8, the opposed faces of those on one jaw being adapted to contact with those on the other jaw as is shown clearly in Fig. 4, when the jaws are closed. Coiled springs 9 are housed within the casing 1 and positioned to bear against the outer faces of the arms 8 at one end and at their other end against the end walls of housings 10 mounted in the container 1 as is shown clearly in Fig. 4. These springs 9 are held in operative position by means of studs 11 and 12 carried respectively by the arms 8 and the housing 10. These springs operate to normally force the jaws 5 and 6 toward each other and to hold them yieldably in engaged position permitting them to be opened on the insertion of the mouth of a milk bottle, the bevelled faces 7 of said jaws facilitating such insertion.

From the above description, it will be obvious that when a milk bottle mouth M is pushed upwardly through the opening 2 between the jaws 5 and 6, that said jaws 5 and 6 will be forced apart a sufficient distance to permit the mouth of the bottle to pass between them and under the tension of the springs will close around the neck of the bottle as shown in Fig. 2 and securely clamp the bottle in engaged position and hold it against withdrawal.

Releasing means for disengaging the jaws 5 and 6 from the neck of the bottle B are here shown in the form of uprights or posts 13 and 14 rising from the jaws 5 and 6 midway the ends thereof as is shown clearly in Fig. 4, and which are of a length to extend above the mouth of the bottle when the bottle is in operative position within the receptacle 1 as is shown clearly in Fig. 2. A link 15 is pivotally connected at one end with the upper end of the post 13 and at its other end is pivotally connected to a lever 16 midway the length of said lever, said link being preferably bifurcated to receive the lever as is shown clearly in Fig. 3. The lever 16 is pivoted at one end to the upper end of the post 14, said lever being here shown bifurcated and straddling said post end, the free end of the lever being enlarged and flattened as shown at 17 to form a finger piece for actuating the lever. This lever and link connection with the jaws 5 and 6 forms a substantially toggle like construction so that when the finger piece 17 is depressed, the jaws 5 and 6 will be moved radially or laterally away from the bottle against the tension of the springs 9 thereby releasing the bottle and permitting it to be removed from the receptacle 1.

It is of course understood that before the releasing of the bottle can be accomplished, the door 3 must be opened by first unlocking the lock 4 by means of a key.

From the above description, it will be obvious that in the use of this device the receptacle 1 may be secured to the side wall of a building by means of fasteners inserted from the interior of said receptacle or to any other suitable support, and when so located and the door 3 closed and locked, no access may be had to the interior thereof except by an authorized person having a key to the lock 4. When so positioned, all that is necessary for the milkman to do is to insert the mouth of the bottle B through the opening 2 in the bottom of the receptacle and give a slight upward push thereon when the spring jaws 5 and 6 will securely engage the bottle neck under the beads on the bottle mouth and hold the bottle against all possible efforts to remove it thereby preventing danger of the milk being stolen or upset as frequently occurs with the present methods employed of leaving bottles of milk on the doorsteps of residences. When the person for whom the milk is intended or one having a key to the lock 4 desires to remove the bottle B, all that is necessary is to open the door 3, depress the lever 16 by pressing on the finger piece 17 causing the jaws 5 and 6 to move away from each other and let the bottle mouth pass through the opening 2 in the receptacle 1.

These holders 1 may be cheaply constructed and they may be of any desired size according to the number of bottles intended to be protected and held thereby, a single opening or closure 3 being sufficient to permit the release of any number of bottles by simply reaching the hand within the container 1 through the opening and depressing the respective lever which controls the clamping jaws.

While the clamping jaws 5 and 6 are shown arranged to hold a single milk bottle only, it will be obvious that they may be extended and shaped to receive and support a plurality of bottles all of which may be releasable by a single releasing mechanism.

While this holder is primarily intended for use in connection with milk bottles, obviously it may be used in connection with any other bottles or receptacles having enlarged mouths or heads for insertion between the jaws 5 and 6 which will reliably hold the bottle or other vessel against withdrawal after being once inserted.

The preferred embodiment of the invention is disclosed in the drawings and set forth in the specification, but it will be understood that modifications within the scope of the claimed invention may be made in the construction without departing from the principle of the invention or sacrificing any of its advantages.

We claim:—

1. A thief proof holder for bottles and the like comprising a closed receptacle having an opening in one wall for the insertion of the mouth of the bottle to be held, spring closing bottle clamping jaws arranged within said receptacle one on each side of said opening, and a link and lever mechanism connected with said jaws operable on depression of said lever from within the receptacle to move the jaws away from each other to release the bottle.

2. A holder of the class described comprising a closed receptacle having an opening in one wall for the insertion of the mouth of the bottle to be held, opposed clamping jaws arranged on opposite sides of said opening within said receptacle, coiled springs arranged to force said jaws toward each other, posts rising from said jaws intermediate their ends, a lever pivoted at one end to one of said posts, and a link pivoted at one end to the other post and at its other end to said lever midway the length thereof whereby the depression of the free ends of said lever will operate to force said jaws away from each other against the tension of said spring to release the bottle.

3. A device for the purpose set forth comprising a closed receptacle having an opening in one wall thereof for the insertion of the mouth of a bottle to be held, oppositely disposed and laterally shiftable bottle clamping means carried by the receptacle and adapted to engage with the bottle neck, and a lever mechanism arranged within the receptacle and operated from the interior thereof for releasing said clamping means.

4. A device for the purpose set forth comprising a receptacle having an opening in one wall thereof for the insertion of the mouth of a bottle to be held, a pair of oppositely disposed and laterally shiftable bottle clamping jaws slidably mounted on the bottom of the receptacle and adapted to engage with the neck of the bottle for holding the latter, and a lever mechanism connected with said jaws and arranged within said receptacle and operated from the interior of the receptacle for releasing said clamping jaws with respect to the bottle.

5. A device for the purpose set forth comprising a receptacle having an opening in the bottom thereof for the insertion of the mouth of a bottle to be held, a pair of oppositely disposed and laterally shiftable bottle clamping jaws slidably mounted on the bottom of the receptacle and adapted to engage with the neck of the bottle for holding the latter, said jaws extending from one side to the other side of the receptacle, spring controlled elements engaging the ends of the jaws for maintaining them in engagement with the neck of a bottle, and a lever mechanism connected with said jaws and adapted when operated to release the jaws from the neck of the bottle.

In testimony whereof, we affix our signatures hereto.

LORENZO THOMAS PERRY.
DAVID H. HALE.